April 17, 1962  C. S. MASTERSON  3,029,511
PRUNING MECHANISM WITH ROTARY SAW
Filed March 27, 1961  3 Sheets-Sheet 1
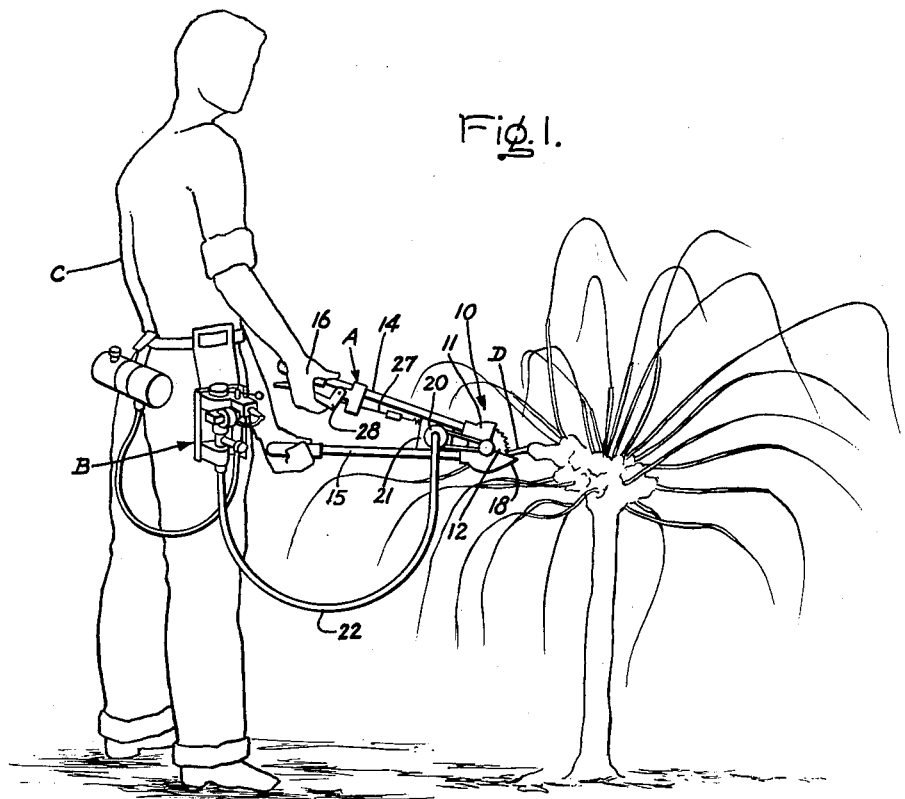
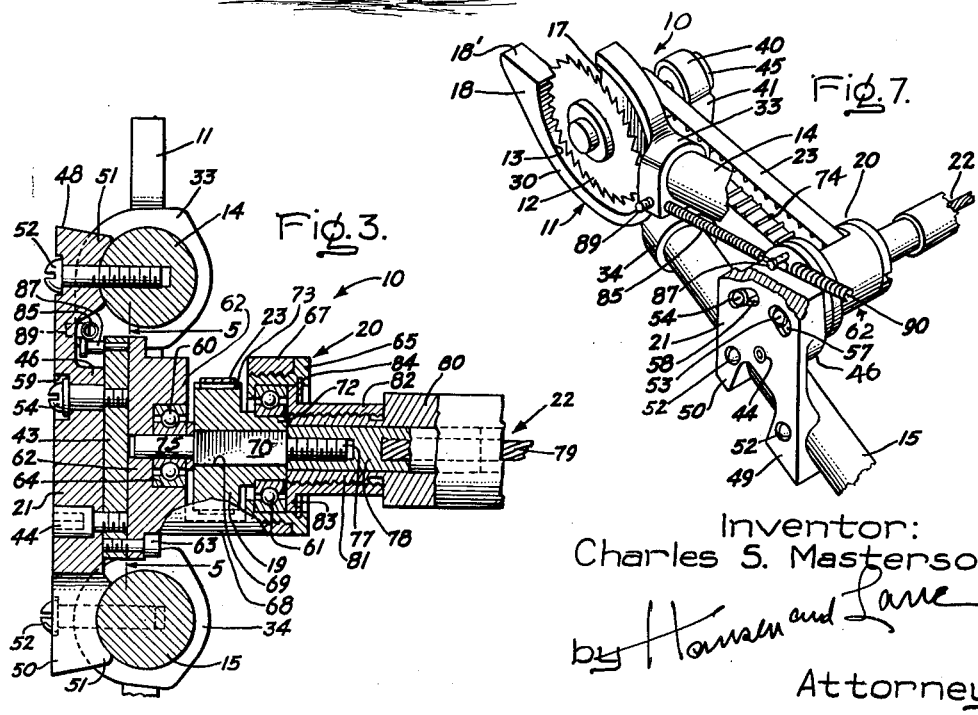
Inventor:
Charles S. Masterson,
by Hansen and Lane
Attorneys.

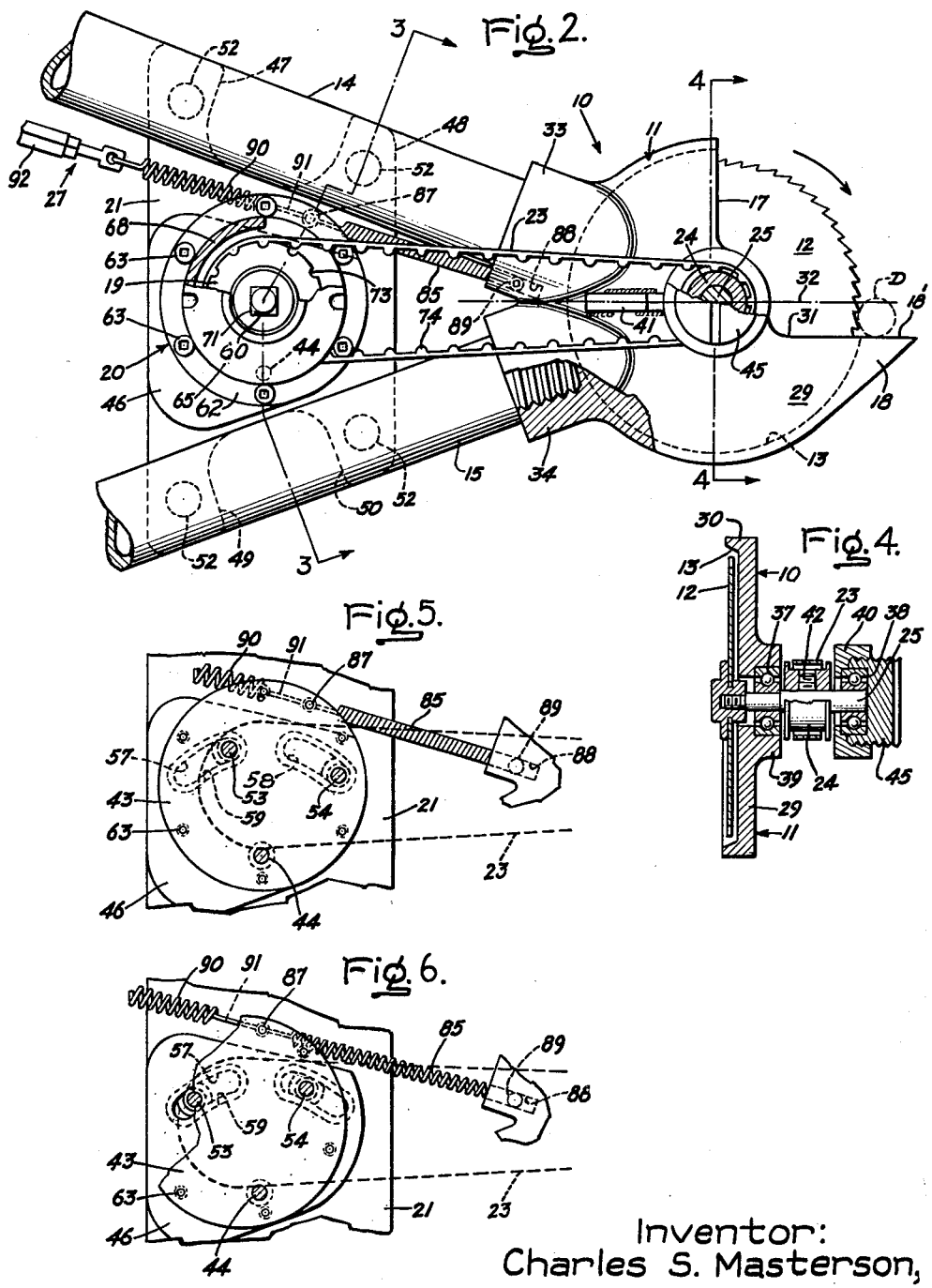

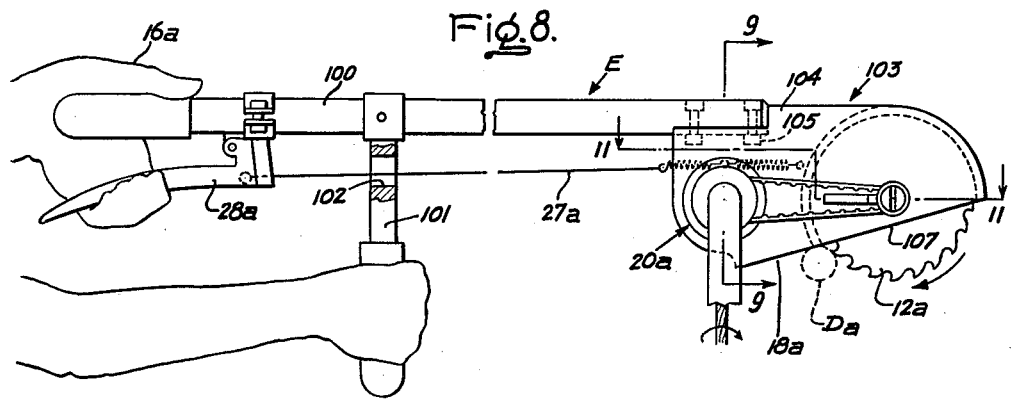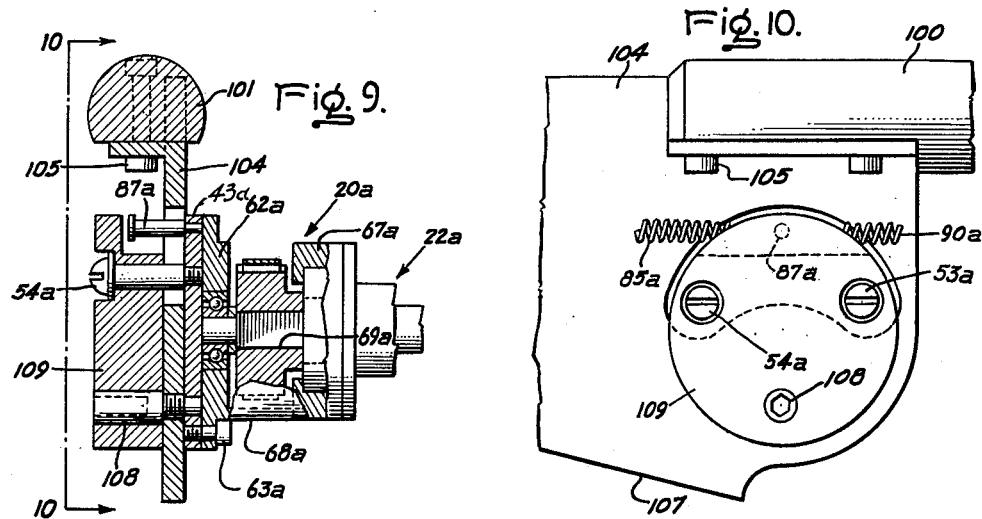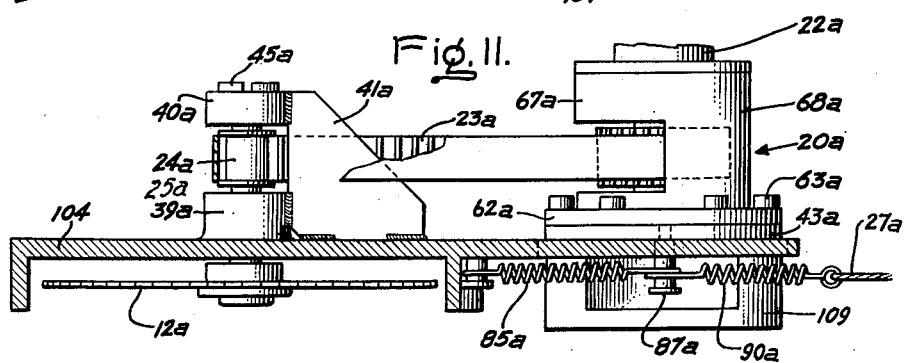

United States Patent Office 3,029,511
Patented Apr. 17, 1962

3,029,511
PRUNING MECHANISM WITH ROTARY SAW
Charles S. Masterson, 164 Arundel Road, San Carlos, Calif., assignor of one-half to Joseph Padgett, Jr., Campbell, Calif.
Filed Mar. 27, 1961, Ser. No. 98,662
6 Claims. (Cl. 30—167)

The present invention relates to a pruning mechanism, and pertains more particularly to a rotary saw type pruner having improved cutting and driving mechanism.

Many types of fruit, such as, for example, grapes and apricots, bear fruit only on new growth, so it is customary each winter to prune out the bearing branches of the past season to prevent the trees from accumulating too much old wood, and to direct the energy of the tree mainly toward the growth of new, fruit bearing branches.

In the past, numerous pruning mechanisms have been devised using a rotary saw for severing the branches of trees. However, some of these prior art pruners have proven impractical, due either to excessive weight, particularly in the zone of the cutting head, to the failure to provide proper support and guidance means for a branch or cane during a severing operation, or for the lack of suitable drive means for the saw.

The present invention provides an improved and simplified hand-held pruning mechanism having a rotary saw cutting mechanism and improved and simplified drive and control means for the saw.

The invention also provides a rotary saw type pruner having a simple, light weight saw head with improved drive and control means for the rotary saw therein.

Another object of the invention is to provide an improved, rotary saw type pruning mechanism.

These, and other objects and advantages of the invention, will be apparent from the following description and the accompanying drawings, wherein:

FIG. 1 is a perspective view showing a pruner embodying the invention as it appears when pruning a grape vine.

FIG. 2 is an enlarged, fragmentary, side elevational view of the saw head portion of the mechanism shown in FIG. 1, portions being broken away.

FIG. 3 is a sectional view taken along line 3—3 of FIG. 2.

FIG. 4 is a sectional view taken along line 4—4 of FIG. 2.

FIG. 5 is a fragmentary, sectional view taken along line 5—5 of FIG. 3, portions of the drive pulley support plate being broken away, the pivotally mounted drive pulley assembly being shown in its normal, belt-releasing position.

FIG. 6 is a sectional view similar to FIG. 5, but showing the drive pulley assembly swung to belt-tautening position.

FIG. 7 is a fragmentary, perspective view in reduced scale of the saw head portion of the mechanism shown in FIG. 2, portions being broken away.

FIG. 8 is a side elevational view of a modified form of the invention which is particularly adapted to be used for tree pruning, intermediate portions of the long handle member and the belt tautening cable being broken away.

FIG. 9 is an enlarged, sectional view taken along line 9—9 of FIG. 8, portions being shown in elevation.

FIG. 10 is a fragmentary, similarly enlarged, side elevational view looking in the direction of the arrows 10—10 of FIG. 9.

FIG. 11 is a sectional view taken along line 11—11 of FIG. 8, and to the same scale as FIGS. 9 and 10.

Briefly, an illustrative embodiment A (FIGS. 1-7) of the invention comprises a saw head assembly 10, which, in turn, comprises a head member 11 having a rotary, circular saw 12 journaled to rotate in a recess 13 in one side thereof, and with a pair of handle members 14 and 15 extending divergently rearwardly therefrom. A work receiving notch 17 is provided in the upper forward quadrant of the head member 11 with its lower edge spaced downwardly from a fore-and-aft diameter of the saw, and a work support 18 extends forwardly from the lower edge of the notch 17 toward which the saw rotates.

A drive pulley 19 is journaled in a pulley support assembly 20 which is pivoted eccentrically thereof on a pulley support plate 21 fixedly secured in the angle between the handles 14 and 15.

The drive pulley 19 is in driven relation with one end of a flexible shaft 22 (FIG. 3) the other end of which (FIG. 1) is operatively connected to a suitable power source, such as a small, internal combustion engine B (FIG. 1) carried by an operator C.

The drive pulley 19 has positive driving engagement with a toothed drive belt 23, which is passed around the correspondingly notched drive pulley 19, and also around a smooth, driven pulley 24 secured to the arbor 25 of the saw 12. When the drive belt 23 is taut a frictional driving force will be exerted by it on the smooth saw pulley 24, while when the belt 23 is loosened, it will slip easily on the smooth periphery of the saw pulley.

A belt tautening cable 27 is controlled by a hand grip lever 28 mounted at the free end of the handle bar 14. When the lever 28 is gripped by an operator C and forced inwardly toward the handle upon which it is mounted, the drive pulley assembly 20 is swung away from the saw head 10 to tauten the drive belt 23 into frictional driving relation with the saw pulley 24.

*Saw Head Assembly*

Referring to the drawings FIGS. 1-7 in greater detail, the head member 11 of the saw head assembly 20 comprises a flat, generally circular plate portion 29, with slightly over a quarter section thereof removed to form the work receiving notch 17. A generally annular flange 30 encircles one side of this circular plate portion 29 and forms the recess 13 (FIGS. 4 and 7) of a size to enclose and shield the circular saw blade 12 when the latter is mounted therein.

The work support 18 is formed integrally and co-extensively with the lower edge 31 of the work receiving notch 17, and projects forwardly therefrom a sufficient distance to support a work piece D of desired maximum diameter thereon. The work supporting upper face 18' of this work support 18 is flat, and is parallel to a plane defined by a diameter 32 (FIG. 2) of the saw, and the axis of rotation of the saw. The flat upper face 18' of the work support 18 is spaced downwardly from the saw diameter 32 by a distance of approximately 18° of the circumference of a saw blade 12 mounted on the arbor 25. This spacing and positioning of the work support 18 is important, since it provides for an easy feeding of the work into the saw, and minimizes jamming.

A pair of internally threaded, angularly diverging handle bosses 33 and 34 are formed integrally on the rear side of the flange 30. The handles 14 and 15 are of suitable light weight material and are threaded to screw into their respective bosses 33 and 34.

The saw blade 12 is spaced with free running clearance from the plate portion 29, and also from the encircling flange 30, an is secured co-axially in a conventional manner to the arbor 25. The latter is journaled in inner and outer ball bearings 37 and 38 mounted co-axially on the head member 11.

The inner ball bearing 37 is fitted into a recess provided therefor in a generally cylindrical boss 39 formed co-axially on the outer side of the plate portion 29, and the outer bearing 38 is fitted into an annular bearing support 40 formed integrally with the outer end of a triangular bracket 41, the inner end of which, in turn, is formed integrally with the circular plate portion 29. A threaded bearing retainer and grease seal cap 45 is screwed into the internally threaded outer portion of the outer bearing support ring 40. The smooth surfaced, driven saw pulley 24 is secured to the saw arbor 25 between the ball bearings 27 and 28, as by means of a set screw 42 (FIG. 4).

*Drive Pulley Assembly and Drive*

The drive pulley assembly 20 comprises a base plate 43, which is pivotally connected by a pivot screw 44 to a boss 46 formed on the drive pulley support plate 21. The pivot screw 44 is shouldered to limit its penetration into the support plate 21, and its head fits into a counterbore provided therefor in the mounting plate 21.

The pulley support plate 21 is fixedly mounted in the angular space between the handles 14 and 15 a desired distance from the head member 11. To this end the pulley support plate 21 is provided with a pair of upwardly extending ears 47 and 48, and also with a pair of downwardly extending ears 49 and 50 (FIGS. 2, 3 and 7). Each of said ears is formed with an integral, concavely faced pad 51 (FIG. 3) on its outer end to fit onto the handles 14 and 15. The pads 51 are secured to their respective handles by machine screws 52, which pass through holes provided therefor, one in each ear, and are screwed into threaded holes provided therefor in the handles.

Two limit stop screws 53 and 54 (FIGS. 5 and 6) are provided to limit pivotal movement of the pulley assembly 20. These stop screws are also shouldered as shown in FIG. 3 to limit their penetration into the base plate 43. The shank portions of these screws ride, respectively, in arcuate slots 57 and 58 provided therefor in the support plate 21. The arcuate slots 57 and 58 are concentric with the pivot screw 44, and are recessed at 59 on their outersides to receive the heads of the limit stop screws 53 and 54 therein.

The notched drive pulley 19 is also journaled, like the saw arbor 25, in inner and outer ball bearings 60 and 61 mounted co-axially in a bearing support member 62 (FIGS. 2, 3 and 7) which is fixedly secured to the pulley assembly base plate 43 by machine screws 63. The latter pass through holes provided therefor in the bearing support member 62 and are screwed into threaded holes provided therefor in the base plate 43. The inner drive pulley ball bearing 60 is fitted into a recess 64 in the bearing support member 62, and the outer drive pulley ball bearing 61 is mounted co-axially with the inner ball bearing 60 in a threaded bearing retainer 65, which is screwed into an internally threaded outer bearing mounting ring 67 formed integrally with a cylindrically curved arm 68, which is also integral with the inner bearing support member 62.

The belt drive pulley 19 is provided with an axial bore 69 of non-circular cross sectional shape, for example, square, into which is fitted a correspondingly shaped portion 70 of a drive pulley arbor 71. The latter has an axially extending, round, shaft portion 75 which is fitted into the inner race of the inner ball bearing 60.

The drive pulley 19 is provided with a hub extension 72 which is fitted co-axially into the inner race of the outer ball bearing 61. The drive pulley 19 is provided with a plurality of belt engaging, axially extending notches 73 across its face to receive therein drive teeth 74 of the timing-type drive belt 23 (FIGS. 2 and 7).

On the outer end of the drive pulley arbor 71 there is provided an integral, threaded, axial extension 77, which is screwed into a threaded axial recess provided therefor in a terminal member 78 which is fixedly secured in a conventional manner to the end of the drive cable 79 of the flexible shaft 22, and is journaled in a usual shaft casing end member 80. The latter has an externally threaded portion 81 of reduced diameter which is screwed into the outer end of an internally threaded sleeve 82 having a radially outwardly extending flange 83 on its inner end which fits into the outer bearing retainer 65 and seats against the outer race of the outer ball bearing 61. The flange 83 is retained in position in the bearing retainer 65 by a conventional split ring 84, seated in a usual groove provided therefor in the bearing retainer 65.

The opposite end of the flexible shaft 22 from that shown in FIG. 3 is connected in driven relation in a conventional manner to the engine B or other suitable power supply means. If necessary, suitable, conventional, change-speed mechanism, not shown may be provided between the engine B and the flexible shaft 22 to provide a peripheral speed of the order or 10,000 inches per minnute for the saw 12 when the drive belt 23 is in tautened, saw-driving condition.

A light-weight, belt slackening coil spring 85 has one end thereof in hooked engagement with a machine screw 87 (best shown in FIG. 3) screwed into a threaded hole provided therefor in the pivoted, pulley assembly base plate 43. The other end of this spring is straight, and is inserted in a hole 88 drilled in the upper handle boss 33 (FIGS. 3 and 7). The spring 85 is secured in adjusted position in the hole 88 by a set screw 89 to control the tension of the return spring 85. A much stronger belt tautening spring 90 has one end thereof connected by a link 91 to the same screw 87 as the return spring 85. The other end of the spring 90 is connected to a turnbuckle 92, which, in turn is connected by the cable 27 to the hand grip lever 28.

*Operation*

In using the pruning mechanism A the operator grasps the handles 14 and 15, one in each hand, and with the hand 16 also overlying the belt tautening lever 28. When ready to prune, he closes his grip on the belt control lever 28 to swing it in to belt tautening condition as he presents the saw to a work piece D to be severed. The saw 12, rotating in the direction of the arrow in FIG. 2, urges the work piece D down onto the work support 18 and severs the work piece.

The strength of the belt tightening spring 90 is such that should the saw jam for any reason, the belt 23 will slip on the driven saw pulley 24 before placing a breaking stress on the drive shaft cable 89.

*Modified Form of Figs. 8–11*

The modified form E of the invention shown in FIGS. 8–11 is intended more specifically for pruning trees, where a longer reach is required than in the form A of the invention shown in FIGS. 1–7. Since the structure and operation of the two forms of the invention are generally similar to each other, a brief description of only the portions of the mechanism E which are different from the mechanism A will be sufficient for a complete understanding of the mechanism E by one skilled in the art and familiar with the structure and operation of mechanism A. Since many parts of the two illustrative mechanisms A (FIGS. 1–7) and E (FIGS. 8–11) are either identical or substantially so, such parts are identified herein by the same reference numerals, with the exception that in the mechanism E the suffix "*a*" is added thereto.

A single long handle 100 is provided on the mechanism E, and a short, lateral, bracing handle 101 is secured thereto a desired distance forwardly from the cable actuating hand grip lever 28*a* for grasping by the hand of an operator holding the long handle 100. The short handle 101 has a hole 102 therein through which the belt control cable 27*a* passes.

A combined saw head assembly and pulley support 103 comprises a single, integral plate portion 104, which is secured by bolts 105 to the long handle 100. This plate portion 104 is so formed as to provide support not only for the rotary saw 12*a*, but also for the drive pulley assembly 20*a*, which is pivotally mounted thereon. Thus the plate portion 104 combines in a single unit the functions of both the saw head member 11 and the drive pulley mounting plate 21 of the form A of the invention. The saw 12a and its arbor 25a and the pivotally mounted drive pulley assembly 20a are mounted on the plate 104 in the same way as that described previously herein for their respective counter-parts in the form A of the invention shown in FIGS. 1–6.

Instead of the work receiving notch 17 of the form A of the invention, in the mechanism E the lower edge 107 of the plate 104 is straight, and defines a cord of the circle defined by the saw teeth, which chord is offset downwardly approximately 18° from a diameter of the saw blade and parallel thereto. This straight edge 107 extends rearwardly from the saw to provide a work support 18a. This straight edge construction is preferred to a notch where the saw must operate at a considerable distance from the operator, and frequently where a branch to be severed is located overhead and partially shielded from the operator's view by leaves or other branches. The form and location of the work supports 18 and 18a for both forms of the invention relative to the saws permits easy feeding of the saw into the work piece and with a minimum tendency to jam.

The pulley assembly 20a comprises a base plate 43a which is pivoted on the plate 103 by a pivot screw 108, which is screwed into a hole provided therefor in the plate 103 and has an oppositely extending shank portion 104. The latter provides pivotal support for a backing plate 109 which is mounted on the opposite side of the plate 103 from the pulley assembly 20a, and moves pivotally on the screw 108 with the pulley assembly 20a. Limit stop screws 53a and 54a pass through holes provided therefor in the backing plate 109 and also through an arcuate opening 110 in the mounting plate 104. These screws are also screwed into holes provided therefor in the pulley assembly base plate 43a, the screws being shouldered to limit their penetration into the base plate and thus prevent binding on the mounting plate 104. Engagement of the shanks of the screws 53a and 54a with the ends of the arcuate opening 110 limit the swinging movement of the pulley assembly 20a on the pivot screw 108.

The flexible drive shaft 22a on the mechanism E (FIGS. 8–11) may be similar to that 22 illustrated for the form A (FIGS. 1–7) of the invention, except that the former must obviously be of sufficient length to permit it to reach a power supply mechanism, such as, for example, the gasoline engine B shown in FIG. 1.

The invention provides a simple, easily manipulated, inexpensive and long lived pruning mechanism. It is easy to operate, is not damaged by jamming. Since it requires only a small amount of power to operate, it is economical to use. A pruning mechanism embodying the invention may be extremely light, so that it does not tire a worker using it, and it also requires very little skill for its use, so that workers enjoy using it. A great advantage of the invention lies in the fact that it is very much faster than hand pruning, and does not require the use of a vehicle-mounted power plant so that each worker is independently mobile in a vinyard or orchard.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A pruning mechanism comprising a head member, a plate portion thereon, a saw arbor journaled, in axially perpendicular relation, on the plate portion, a circular saw blade mounted co-axially on the arbor and laterally adjacent said plate portion, an edge of the plate portion defining a chord of the circle of the teeth of a saw blade mounted on the arbor, such chord being parallel to a fore-and-aft diameter of such saw blade and offset therefrom in the direction of saw rotation by an angle of approximately 15° of the saw tooth circle, a smooth surfaced driven pulley secured co-axially to the saw arbor, a drive pulley support plate portion substantially coplanar with the head plate portion, a drive pulley assembly pivotally mounted on the pulley support plate portion, a drive pulley journaled on said pulley assembly in axially offset, axially parallel relation to the pivotal axis of the pulley assembly, a drive belt passed around both pulleys and in positively driven relation with the drive pulley, the belt being of such a length that when the drive pulley assembly is pivotally swung to move the axis of the drive pulley toward the saw arbor the belt will be slack for free slippage on the saw arbor pulley, and when the pulley assembly is swung to move the axis of the drive pulley away from the saw arbor the belt will be tautened into frictional, driving engagement with the saw arbor, power drive means in driving relation with the drive pulley, a supporting handle secured to the pulley support plate portion to extend rearwardly therefrom, and actuating means mounted on such handle for actuation by an operator to swing the drive pulley assembly to move the axis of the drive pulley toward and away from the saw arbor.

2. A pruning mechanism comprising a head member, a plate portion thereon, a saw arbor journaled, in axially perpendicular relation, on the plate portion, a circular saw blade mounted co-axially on the arbor and laterally adjacent said plate portion, an edge of the plate portion defining a chord of the circle of the teeth of a saw blade mounted on the arbor, such chord being parallel to a fore-and-aft diameter of such saw blade and offset therefrom by an angle of approximately 15° of the saw tooth circle, a driven pulley secured co-axially to the saw arbor, a drive pulley assembly pivotally mounted in rearwardly spaced relation to the saw arbor, a drive pulley journaled on said pulley assembly in axially parallel relation to the saw arbor, a drive belt passed around both pulleys and of such a length that when the drive pulley assembly is pivotally swung to move the axis of the drive pulley toward the saw arbor the belt will be slack for free slippage on at least one of said pulleys, and when the pulley assembly is swung to move the axis of the drive pulley away from the saw arbor the belt will be tautened into frictional, driving engagement with both of said pulleys, power drive means in driving relation with the drive pulley, an elongated supporting handle secured to the pulley support member to extend rearwardly therefrom, and actuating means mounted on such handle for actuation by an operator to swing the drive pulley assembly to move the axis of the drive pulley toward and away from the saw arbor.

3. A pruning mechanism comprising a plate portion having a circular, saw-receiving recess on a side thereof, a saw arbor journaled, in axially perpendicular relation, on the plate portion and co-axially of such recess, a circular saw blade mounted co-axially on the arbor and within such recess, said plate portion having a work receiving notch in the forward upper quadrant thereof, the lower edge of such notch defining a chord of the circle of the teeth of a saw blade mounted on the arbor, such chord being parallel to a fore-and-aft diameter of such saw blade and offset therefrom by an angle of approximately 15° of the saw tooth circle, a driven pulley secured co-axially to the saw arbor, a pair of handles secured divergently to the rear of the plate portion, a drive pulley support member secured to said handles and extending therebetween, a drive pulley base member pivotally mounted on the drive pulley support member, a drive pulley journaled on said base member eccentrically of the pivotal axis of the base member and axially parallel to the saw arbor, a drive belt passed around both pulleys and of such a length that when the base member is swung about its pivotal axis to move the axis of the drive pulley toward the saw arbor the belt will be slack for free slippage on at least one of said pulleys, and when the pulley assembly is swung to move the axis of the drive pulley away from the saw arbor the belt will be tautened into frictional, driving engagement with said pulleys, power drive means in driving relation with the drive pulley, a supporting handle secured to the pulley support plate portion to extend rearwardly therefrom, and actuating means mounted on such handle for actuation by an operator to swing the drive pulley assembly to move the axis of the drive pulley toward and away from the saw arbor.

4. A pruning mechanism comprising a plate portion having a circular, saw-receiving recess on a side thereof, a saw arbor journaled, in axially perpendicular relation, on the plate portion and co-axially of such recess, a circular saw blade mounted co-axially on the arbor and within such recess, said plate portion having a work supporting edge thereof defining a chord of the saw circle, a driven pulley secured co-axially to the saw arbor, handle means secured to the rear of the plate portion and extending rearwardly therefrom, a drive pulley support member spaced rearwardly from the saw arbor, a drive pulley base member pivotally mounted on the drive pulley support member, a drive pulley journaled on said base member eccentrically of the pivotal support of the base member and axially parallel to the saw arbor, a drive belt passed around both pulleys and of such a length that when the base member is swung about its pivotal axis to move the axis of the drive pulley toward the saw arbor the belt will be slack for free slippage on at least one of said pulleys, and when the pulley assembly is swung to move the axis of the drive pulley away from the saw arbor the belt will be tautened into frictional, driving engagement with said pulleys, power drive means in driving relation with the drive pulley, a supporting handle secured to the pulley support plate portion to extend rearwardly therefrom, and actuating means mounted on such handle for actuation by an operator to swing the drive pulley assembly to move the axis of the drive pulley toward and away from the saw arbor.

5. A pruning mechanism comprising a plate portion having a circular, saw-receiving recess on a side thereof, a saw arbor journaled, in axially perpendicular relation, on the plate portion and co-axially of such recess, a circular saw blade mounted co-axially on the arbor and within such recess, said plate portion having a work supporting edge thereof defining a chord of the saw circle, a smooth surfaced, driven saw pulley secured co-axially to the saw arbor, handle means secured to the rear of the plate portion and extending rearwardly therefrom, a drive pulley support member spaced rearwardly from the saw arbor, a drive pulley base member pivotally mounted on the drive pulley support member, a drive pulley journaled on said base member eccentrically of the pivotal support of the base member and axially parallel to the saw arbor, said drive pulley having a plurality of belt engaging notches in its periphery, a drive belt passed around both pulleys and having a plurality of teeth on its inner side for positive driving engagement with the notched drive pulley of said drive belt being such a length that when the base member is swung about its pivotal axis to move the axis of the drive pulley toward the saw arbor, the belt will be slack for free slippage on the saw pulley, and when the base member is swung to move the axis of the drive pulley away from the saw arbor the belt will be tautened into frictional, driving engagement with said saw pulley, power drive means in driving relation with the drive pulley, a supporting handle secured to the pulley support plate portion to extend rearwardly therefrom, and actuating means mounted on such handle for actuation by an operator to swing the drive pulley base member to move the axis of the drive pulley toward and away from the saw arbor.

6. A pruning mechanism comprising a head member, a saw arbor journaled in the head member, a circular saw blade mounted co-axially on the arbor, said head portion having a work supporting edge thereof defining a chord of the saw circle offset approximately 15° from a diameter of such saw circle and parallel to such diameter, a driven saw pulley secured co-axially to the saw arbor, handle means secured to the rear of the plate portion and extending rearwardly therefrom, a drive pulley support member supported rigidly relative to the saw arbor and therefrom, a drive pulley base member pivotally mounted on the drive pulley support member, a drive pulley journaled on said base member eccentrically of the pivotal support of the base member and axially parallel to the saw arbor, a drive belt passed around both pulleys and of such a length that when the base member is swung about its pivotal axis to move the axis of the drive pulley toward the saw arbor the belt will be slack for free slippage on at least one of said pulleys, and when the base member is swung to move the axis of the drive pulley away from the saw arbor the belt will be tautened into frictional, driving engagement with said pulleys, light weight, portable power drive means in driving relation with the drive pulley, a supporting handle secured to the pulley support plate portion to extend rearwardly therefrom, a belt tautening cable having one end thereof connected to the base member on the same side of the pivotal support thereof as the drive pulley axis, said cable extending rearwardly along the handle, and lever means at the rear end of said handle and operatively connected to said cable for actuation by an operator to swing the drive pulley assembly to move the drive pulley toward belt tautening condition.

No references cited.